Figure 1:
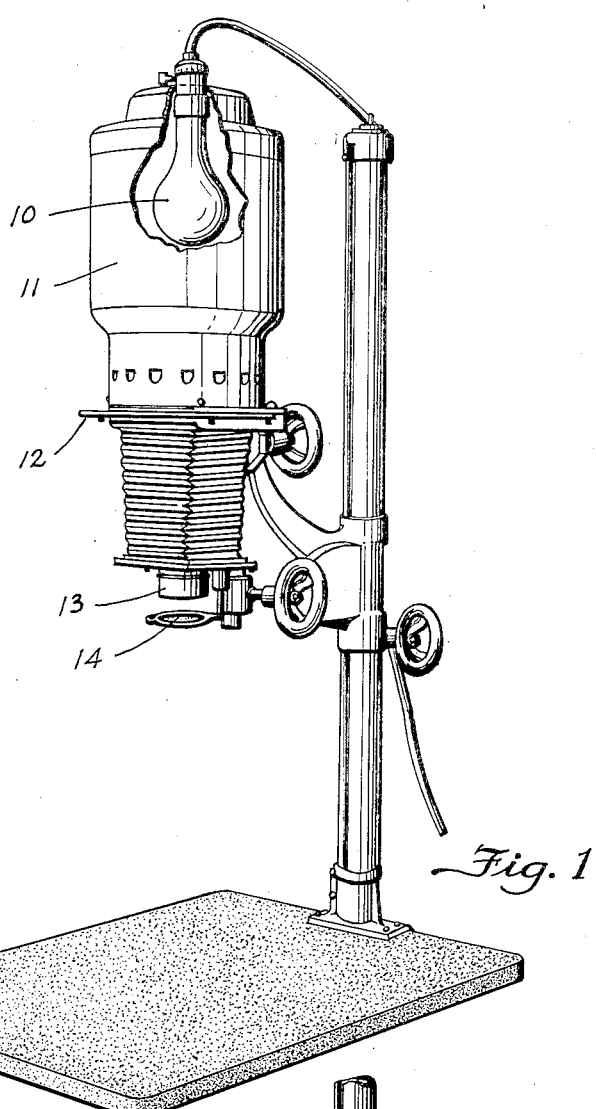

INVENTOR.
Samuel Drucker

Patented Nov. 6, 1945

2,388,394

UNITED STATES PATENT OFFICE 2,388,394

PHOTOGRAPHIC DEVICE AND APPURTENANCE FOR REPRODUCTION PURPOSES

Samuel Drucker, Chicago, Ill., assignor to Burke & James, Inc., Chicago, Ill., a corporation of Illinois Continuation of application Serial No. 411,340, September 18, 1941. This application May 17, 1944, Serial No. 535,945

4 Claims. (Cl. 88—24)

This application is a continuation of original application, Serial No. 411,340, filed September 18, 1941.

This invention relates to improvements in photographic devices and appurtenances, and more particularly to photographic devices and appurtenances to be used for reproduction purposes.

It is well known that in carrying out certain processes in photography, the graphic arts, and certain highly specialized fields dealing with photo-sensitive materials, the light used must be of specific wave length, whereas light of other wave lengths must be excluded.

For some purposes, actinic light, that is, light which is apt to cause a chemical change in the particular photo-sensitive material used, and of which white light is an example, must not be present in the process room. The light which has no effect on the material being worked upon is known as non-actinic light. Sensitized photographic materials may be sensitive to different colors, depending upon the specific purpose for which they are intended. Ordinary photo-sensitive material is not intended to photograph red objects in proper color relation, and such a material is not affected by red light, which means that with respect to such a material red light is non-actinic, whereas white light would be actinic.

Furthermore, it is well known that the color reflected by materials depends upon the nature of the material. For example, red paint reflects red light, but absorbs most of the other colors, if not all of them. Pure blue paint reflects pure blue light, but absorbs all of the other colors, and so on. White objects reflect all the colors to which they are subjected in equal amounts; that is to say, if a white object is subjected to, e. g., red light, it will reflect red, and if it is subjected to blue light, it will reflect blue, and so on. In other words, a white object is not selective in its reflection, but reflects all colors to which it becomes subjected indiscriminately.

It is an object of this invention to provide in or for a photographic reproducing device, a member adapted to serve as a support or background for a photo-sensitive material, which member is of such a nature as to form a selective reflecting means, reflecting at least a every substantial part of, if not all, the light rays of a specified wave length, but, at the same time, rays of this specified wave length only.

More specifically, it is an object of the invention to provide in or for a photographic reproducing device, a member adapted to serve as a background or support for a photo-sensitive material, which member is of such a nature as to reflect at least a very substantial part of all the non-actinic rays of a certain color reaching the member, while absorbing the actinic light rays.

Certain photographic reproducing devices are intended to carry out one phase of the reproduction process under non-actinic light, and another phase under actinic light, e. g., white light. It is an object of this invention to provide a member adapted to serve as a background or support for a photo-sensitive material, which member will serve two different purposes during the two phases mentioned, namely, reflecting during the phase in which only non-actinic light is directed toward the member, sufficient of this non-actinic light to permit observation and adjustment of a projection of the image to be printed, and preventing, during the second phase, when the photo-sensitive material is placed on the supporting member and light containing actinic as well as non-actinic rays is passed onto and through the sensitive material, all but certain non-actinic rays of a specified color from being reflected back.

Figure 2:
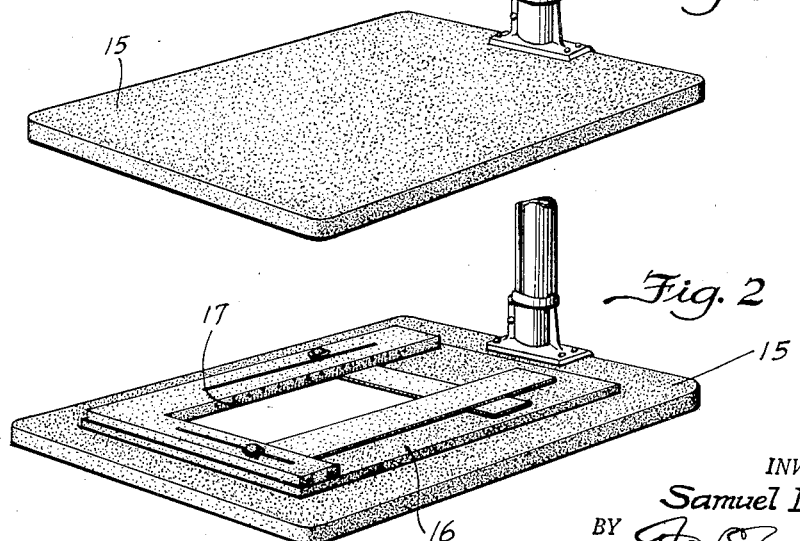

The invention has specific advantages when applied to photographic enlargers, and an example of this particular application of the invention will be described more in detail, reference being had to the accompanying drawing, in which:

Fig. 1 is a perspective view of an enlarger equipped with a selectively reflecting member, in accordance with the principles of this invention, the enlarger being otherwise of conventional construction; and Fig. 2 shows an easel placed upon the baseboard of the enlarger shown in Fig. 1.

In the drawing, the numeral 10 designates a light source adapted to produce light which contains actinic, as well as non-actinic rays, such as white light.

The numeral 11 designates a lamp housing, 12 the usual negative carrier, 13 a projection lens, and 14 a colored transparent plate of shield usually called the safe-light filter. The filter 14 is so mounted that it may be moved into and out of the path of the light emitted by the lamp 10, and passing through the lens 13. The filter 14 is of some non-actinic color, generally of red color, such as ruby.

Below the above-referred-to parts, which together form the so-called enlarger head, there is arranged a baseboard 15. The sensitized paper upon which a print is to be made, may be placed either directly upon the opaque baseboard 15, or a special easel 16 may be employed, as shown in Fig. 2, and is well known in the art.

In using an enlarger in a "dark room," it is common practice to first project the negative to be reproduced, upon the baseboard, with non-actinic light only, that is, with the safe-light filter 14 in the path of the rays emitted by the lamp 10. If the filter 14 is of ruby color, the rays of light directed from the enlarger head onto the baseboard 15 will be ruby rays. Guided by the projected image on the baseboard, various adjustments of the enlarger are usually made, in order to adjust the projected image to a desired size, to obtain a properly focused image, to determine which kind of projecting lens is the most appropriate for a certain negative, how the easel, where such is used, is to be adjusted, etc.

In order to make the image projected through the filter in non-actinic color clearly visible on the baseboard 15, it has heretofore been the practice to use a baseboard having a white surface. Such a white surface will reflect the non-actinic light projected thereon through the colored safelight filter, and, therefore, there will be visible to the observer an image on the baseboard which is of the color of the filter, in the example mentioned of ruby color. While such a white enlarger baseboard affords good visibility of the image projected thereupon with non-actinic light rays, it has been found that draw-backs are connected with the use of such a white baseboard during that phase of the process in which, for making the actual exposure of the sensitized paper placed upon the baseboard, this paper is subjected to the action of white light projected through the lens 13 without the use of the safe-light filter. In this operation, the rays of white light pass through the paper, and if a white baseboard is used as a support for the sensitized paper, these actinic rays will be reflected back through the paper. This back reflection of white light will cause a cloudy or hazy effect to be imparted to the reproduction.

The present invention avoids this draw-back by using a baseboard 15 which is not of white color, but of non-actinic color, in particular, of the same non-actinic color as the filter 14. If the filter 14 is of ruby color, then at least those surfaces of the baseboard 15 which face the lens 13, and, therefore, are exposed to light are also colored ruby. It will be found that a ruby surface under ruby light, will appear the same to an observer as a white surface under ruby light, and that an image projected by ruby light will present itself to the observer in practically the same manner, whether the baseboard upon which the image is projected is white or ruby. Under white light, however, the red baseboard will act differently from a white one. Whereas a white baseboard will reflect, without any selection, all the actinic and non-actinic rays reaching the baseboard after having passed through the paper on that baseboard; the opaque red baseboard, when reached by such actinic and non-actinic rays, will reflect selectively only those non-actinic rays which are of red color, while arresting by absorption all the actinic rays, as well as those non-actinic rays which differ in wave length from the wave length of red. Therefore, any rays of light which are reflected back through the paper by the baseboard will be non-actinic, and the objection which existed with regard to white baseboards will be overcome.

If an easel 16 is used for holding the enlarging paper on the baseboard, this easel, too, should be of the non-actinic color used for the safelight filter 14 and the baseboard 15. The gauge lines or gauge figures 17 which are usually employed on the easel, should also be of a non-actinic color, e. g., a bold red.

It will be understood that the colored baseboard or other surface contemplated to serve as a selective reflecting means within the purview of the present invention must not be transparent, but should be sufficiently opaque to reflect at least a major part of the selected non-actinic rays reaching the baseboard. A transparent plate would not be suitable, for two reasons:

(1) A transparent plate would reflect so little of the colored light that a very faint image only, if any image at all, would be visible to an observer. It is well known that an ordinary transparent glass plate, for instance, does not reflect more than approximately 8% of the oncoming light, 4% at the front surface and approximately the same amount at the rear surface of the transparent plate.

(2) As just mentioned, a transparent plate produces a double reflection effect, one on the front surface and another on the rear surface of the plate. Therefore, particularly if the two surfaces of the transparent plate are not finished to a very exact parallelism, the observer may see on the baseboard a doubled image or an image having blurred contours, even though the enlarger may have been adjusted to the position in which optimum sharpness of the print would be obtainable.

While I have shown, in the drawing, a certain type of enlarger, it is to be understood that this particular type of enlarger has been shown by way of example only, and that the invention is applicable not only to enlargers of other types, but also to photographic reproducing devices other than enlargers.

What I claim is:

1. In or for a photographic reproducing device having a source of light emitting actinic and non-actinic rays, optical focussing means, and a light filter of a non-actinic color displaceable from a position in the path of the rays produced by said source of light to a position outside of said path of said rays so as to intercept, when placed in the path of said rays, all rays emitted by said source of light with the exception of the non-actinic rays corresponding in color to the color of said filter, an opaque member adapted to sustain a sensitized element at a distance from said focussing means and said light filter, at least those surfaces of said opaque member which, when said member is in use, are exposed to light from said source of light being colored in the same non-actinic color as said filter.

2. In or for a photographic enlarger having a projection system including a projection lens, a source of light emitting actinic and non-actinic rays behind said projection lens, and a light filter of a non-actinic color displaceable from a position in the path of the rays produced by said source of light to a position outside of said path so as to intercept, when placed in the path of said rays, all rays emitted by said source of light with the exception of the non-actinic rays corresponding in color to the color of said filter, an opaque member adapted to sustain a sensitized element facing said projection lens and said light filter at a distance so that an image may be projected through said light filter onto said opaque member or, when said sensitized element is placed on said member, onto said element, at least those surfaces of said opaque member which during use face said lens being colored in the same non-actinic color as said filter, so as to reflect of the rays passing through said filter when an image is projected through said filter onto said opaque member at least a major part, creating thereby a reflected image in the color of said filter which is readily observable for adjustment and focussing purposes, while acting as a means for arresting by absorption any actinic rays reaching said member when said filter is removed from the path of the rays produced by said projection system.

3. In a photographic enlarger having a projection system including a projection lens, a source of light emitting actinic and non-actinic rays behind said projection lens and a light filter of a non-actinic color displaceable from a position in the path of the rays produced by said source of light to a position outside of said path so as to intercept, when placed in the path of said rays, all the rays emitted by said source of light with the exception of the non-actinic rays corresponding in color to the color of said filter, an opaque base-board facing said projection lens and said light filter at a distance so that an image may be projected through said light filter onto said base-board, said base-board having at least those surfaces facing said lens and said light filter colored in the same non-actinic color as said filter so as to reflect of the rays passing through said filter when an image is projected through said filter onto said base-board at least a major part, creating thereby a reflected image in the color of said filter which is readily observable for adjustment and focussing purposes, while acting as a means for arresting by absorption any actinic rays reaching said base-board when said filter is removed from the path of the rays produced by said projection system.

4. For use with a photographic enlarger having a projection system including a projection lens, a source of light emitting actinic and non-actinic rays behind said projection lens and a light filter of a non-actinic color displaceable from a position in the path of the rays produced by said source of light in which it intercepts all the rays emitted by said source of light except the non-actinic rays corresponding in color to the color of said filter to a position outside of said path, an easel having the easel board facing said lens and said light filter when that easel is placed for use with the enlarger colored in the same non-actinic color as said filter so as to reflect of the rays passing through said filter when an image is projected through said filter onto said easel at least a major part, creating thereby a reflected image in the color of said filter which is readily observable for adjustment and focussing purposes, while acting as a means for arresting by absorption any actinic rays reaching said member when said filter is removed from the path of the rays produced by said projection system.

SAMUEL DRUCKER.